Figure 3:
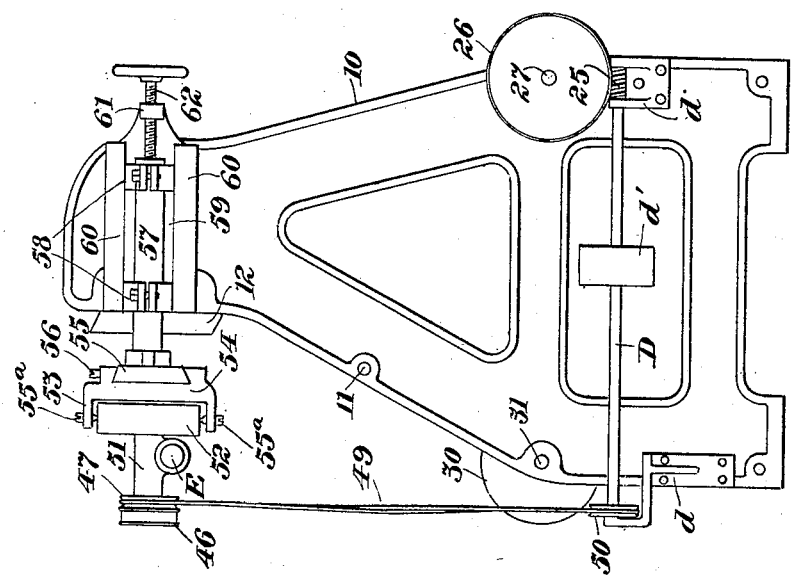

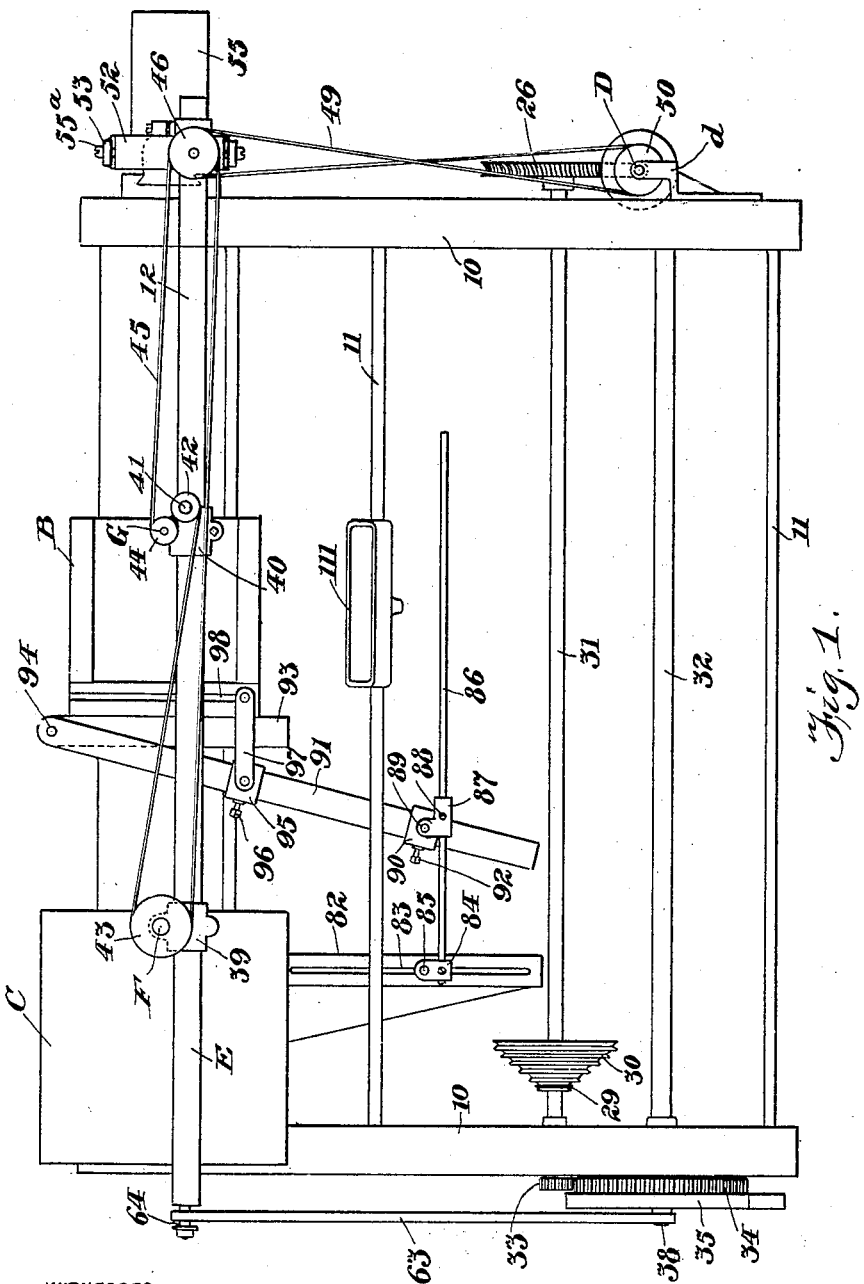

V. J. HANSEN.
ENGRAVING MACHINE.
APPLICATION FILED NOV. 29, 1905.

No. 912,240.

Patented Feb. 9, 1909.
4 SHEETS—SHEET 2.

WITNESSES:
Robert Head
V. E. Nichols

INVENTOR
Valdemar J. Hansen,
BY
Griffin & Bernhard,
ATTORNEYS

V. J. HANSEN.
ENGRAVING MACHINE.
APPLICATION FILED NOV. 29, 1905.

912,240.

Patented Feb. 9, 1909.
4 SHEETS—SHEET 3.

WITNESSES:
Robert Head
V. E. Nichols

INVENTOR
Valdemar J. Hansen,
BY
Griffin & Bernhard.
ATTORNEYS

V. J. HANSEN.
ENGRAVING MACHINE.
APPLICATION FILED NOV. 29, 1905.
912,240.
Patented Feb. 9, 1909.
4 SHEETS—SHEET 4.
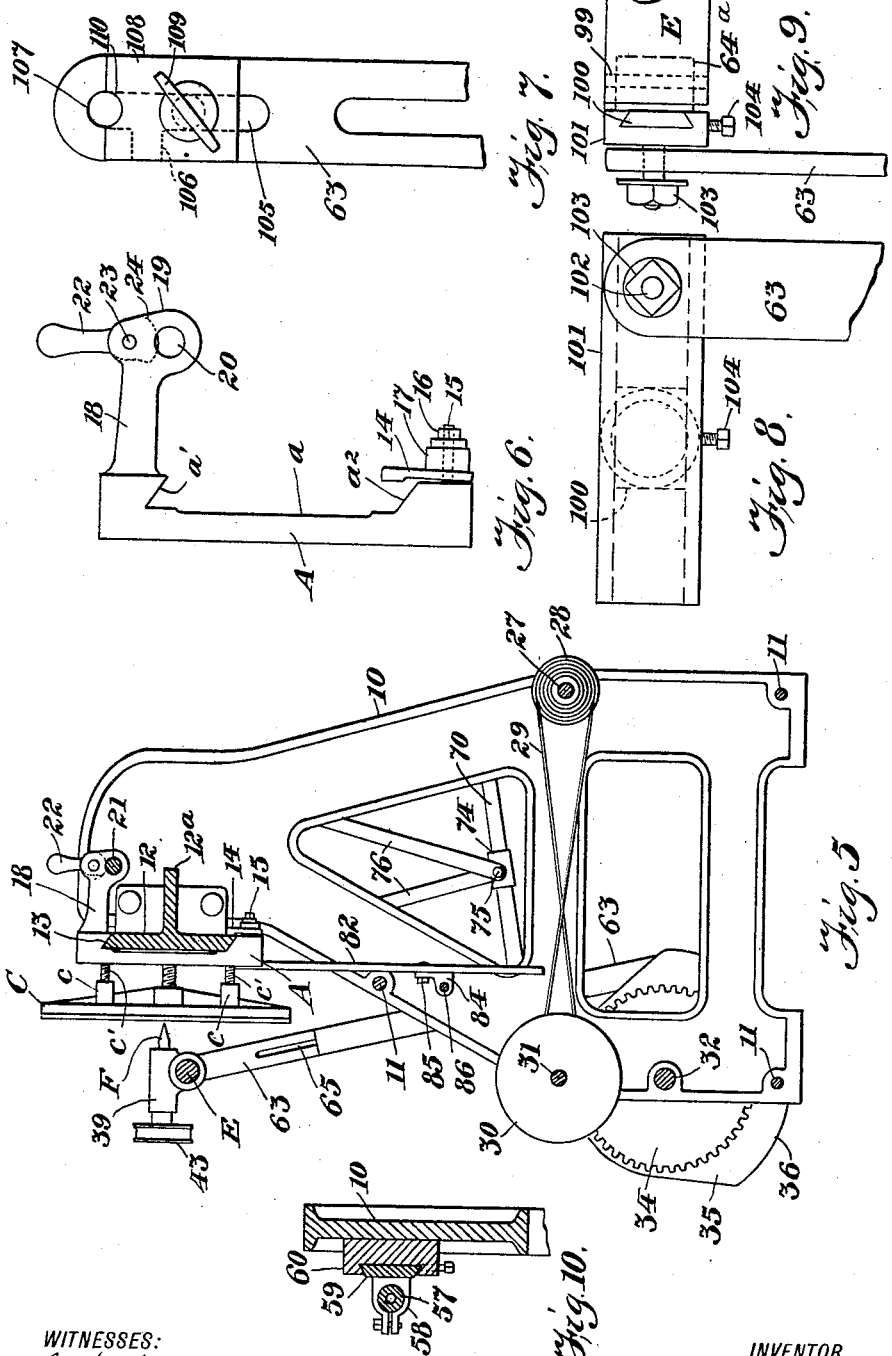
WITNESSES:
Robert Head
V. E. Nichols
INVENTOR
Valdemar J. Hansen,
BY
Griffin & Bernhard.
ATTORNEYS

UNITED STATES PATENT OFFICE.

VALDEMAR J. HANSEN, OF NEW YORK, N. Y., ASSIGNOR TO SIGURD A. NORRING, OF NEW YORK, N. Y.

ENGRAVING-MACHINE.

No. 912,240.  Specification of Letters Patent.  Patented Feb. 9, 1909.

Application filed November 29, 1905. Serial No. 289,545.

*To all whom it may concern:*

Be it known that I, VALDEMAR J. HANSEN, a citizen of the United States, residing at the city of New York, borough of Brooklyn, in the county of Kings and State of New York, have invented certain new and useful Improvements in Engraving-Machines, of which the following is a specification.

My invention relates to engraving machines of that kind which are used principally for die cutting, either in relief or in intaglio.

In my present invention it is possible to enlarge or reduce the work as compared with the model or pattern; to regulate the depth of the cut on the work; to make the tracer or pointer follow the model easily and accurately; to regulate the length of stroke or travel of the tracer across the model; and to feed the work carrier automatically and in proportion to the travel of the model carrier.

Various other objects and features of the invention will appear in the course of the following description.

According to the present invention, I employ two tables each adapted for movement on the machine frame, relatively to a tracer and a cutter, one of said tables being intended to carry the model or pattern, and the other the work to be operated upon by the cutter. The model table is moved at the required speed by a positive feed mechanism operated automatically from one of the machine shafts. The work table is operated by connections with the model table so as to be moved thereby in proportion to the travel of said model table, but these connections are adjustable for the purpose of varying the travel of the work table proportionately to that of the model table, in order to increase or decrease the size of the work to the model.

A beam carries the tracer or pointer and the cutter, and such beam is supported by a universal joint which enables it to be moved in any direction, whereby the tracer is so mounted that it will follow the pattern or model. Said beam is operated automatically by a cam mechanism operated from one shaft of the machine for the purpose of causing the tracer to follow the model; but the means for supporting and operating the beam are adjustable with a view to controlling the range of movement of the tracer so that its travel relative to the work table may be changed according to the nature of the model.

Reference is to be had to the accompanying drawings forming a part of this specification, wherein like characters of reference indicate corresponding parts in all the figures.

Figure 4:
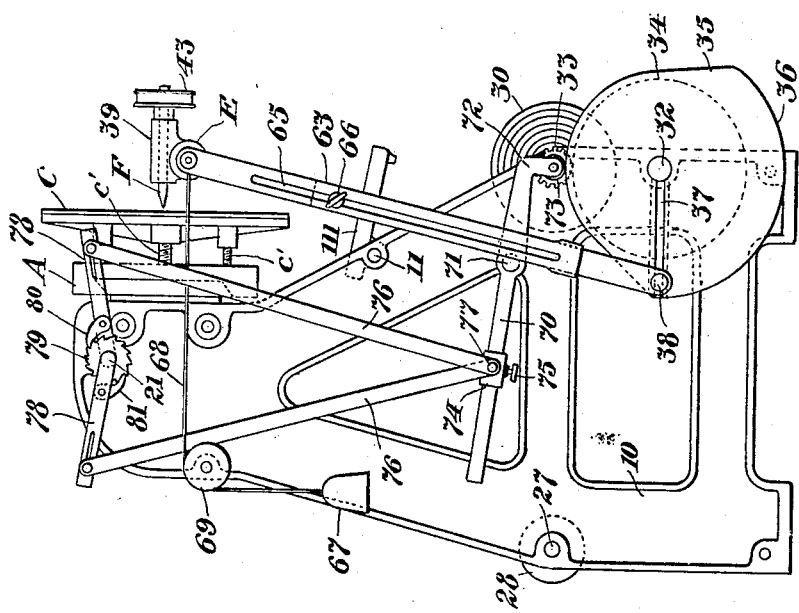
Figure 4:
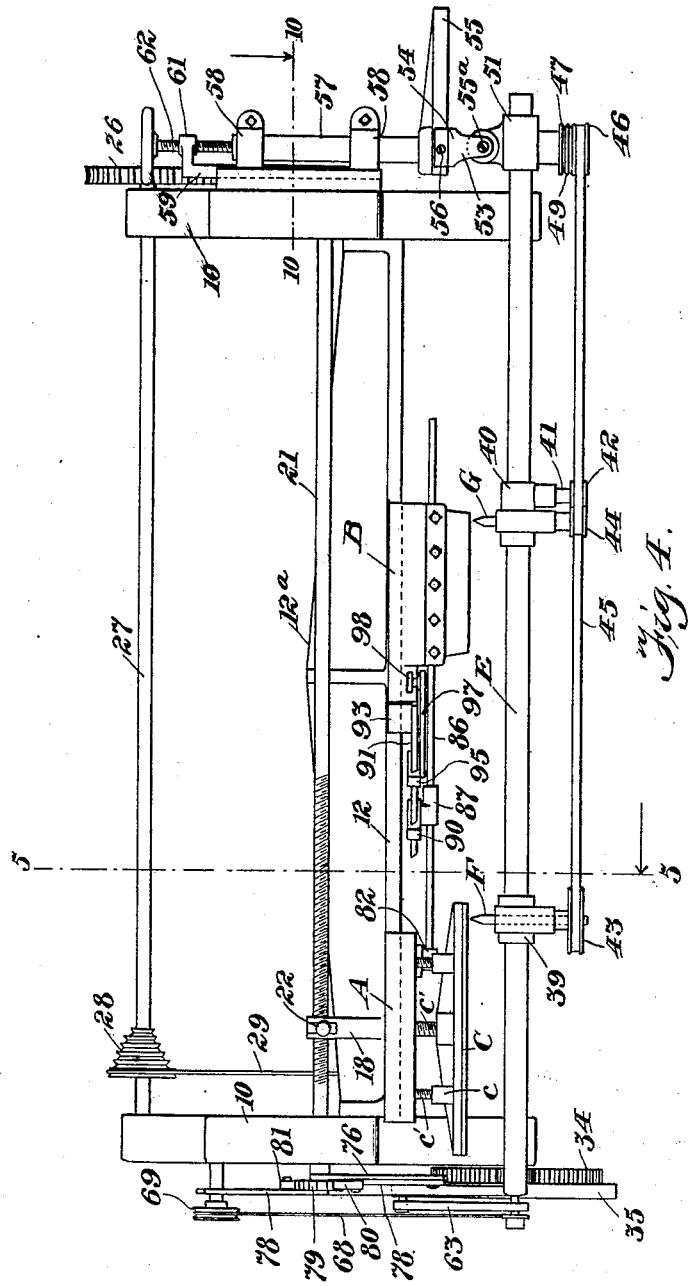

Figure 1 is a side elevation of an engraving machine constructed in accordance with my invention, the pawl and ratchet mechanism being omitted. Figs. 2 and 3 are elevations showing the respective ends of the machine. Fig. 4 is a plan view. Fig. 5 is a vertical cross section taken in the plane indicated by the dotted line 5—5 of Fig. 4, looking in the direction of the arrow. Fig. 6 is a detail view showing the model carriage or table in edge elevation. Fig. 7 is a detail view showing one construction of the link adapted to permit the carrying beam to be dismounted readily therefrom. Figs. 8 and 9 are detail views of another construction of the carrying beam by which the tracer or pointer is made to work easily over a surface of a model or pattern. Fig. 10 is a detail cross-section taken in the plane of the dotted line 10—10 of Fig. 4, looking in the direction of the arrow.

The framework of my improved machine may be of any suitable construction, but as shown by the drawings, this frame is provided with end pieces or frames 10, 10, which are suitably united or tied together by the employment of longitudinal rods 11, a slide rail 12, and by the several shafts employed in the machine; said end frames being also provided with appropriate bearings for the reception of said shafts. As shown by Figs. 4 and 5, the slide rail 12 is provided with suitable webs 12$^a$, for the purpose of stiffening the same, and this rail extends in a horizontal direction between the end frames 10. The slide rail 12 serves as the support for horizontally movable carriages or tables, one of which is indicated at A, and the other at B. The rail 12 is shown by Fig. 5 as having beveled edges 13, the angle of the lower edge being less than the angle of the top beveled edge, whereby the carriages or tables are adapted to be easily fitted on the slide rail, so as to have proper engagement therewith, for the purpose of restraining the carriages or tables from having any loose lateral motion on the rail, while at the same time the carriages are free to move edgewise toward and from each other as required in the operation of the machine. The carriage or table A is adapted to support the model or pattern. As shown by Fig. 6, this carriage is provided in its rear side with a recess $a$, the upper wall of said recess being beveled at $a'$, while the lower wall is beveled at $a^2$, whereby the edges of the carriage will properly fit the beveled edges of the slide rail 12. The edge $a'$ of the carriage engages with the top edge of the slide rail, so as to prevent any outward lateral movement of the carriage, but to hold the lower edge of the carriage in proper relation to the slide rail, I employ a shoe 14, which is fitted against the rear lower part of the carriage, so as to have proper engagement with the inner face of the slide rail. This shoe is held in place by a stud bolt 15, on which is screwed a nut 16, and between the nut and the shoe 14 is interposed an elastic or compressible block 17, which may be of rubber or other suitable material.

For the purpose of convenient reference to the parts designated in this specification by reference letters, I will now group them all in a single paragraph, as follows:—

A designates the model table; B designates the work table; $a$ designates a recess in the model table; $a'$ $a^2$ designate beveled edges of said recess $a$; C designates a workbed on the model table A; $c$ designates bosses of the bed C; $c'$ designates adjusting screws for the bed C; D designates a driving shaft; $d$ designates bearings for said shaft D; $d'$ designates a pulley on the shaft D; E designates a carrying beam; F designates a tracer, and G designates a cutter.

The carriage A is adapted to be moved or fed positively through mechanism operated from one of the main shafts of the machine, and said carriage is provided with a rearwardly extending arm 18, the latter being enlarged at 19, and provided with an opening 20, see Fig. 6. Through this opening extends a horizontal feed shaft 21, which is journaled in appropriate bearings on the end frames 10, and this shaft has an external or male screw thread for a part or the whole of its length, as indicated in Fig. 4. In the enlarged end 19 of the arm 18 is mounted a short lever 22, which is pivoted on a pin or bolt 23, one end of said lever being curved as at 24, and formed with screw threads adapted for engagement with the threaded part of the shaft 21, whereby the short part of the lever 22 is constructed to serve as a feed nut adapted to be moved by the rotation of the shaft 21, for the purpose of giving traveling movement to the model table or carriage A.

The work carriage or table B is mounted on or connected with the slide 12, in a similar manner to the model table A, and these two tables are arranged in vertical positions so that the tracer and the cutter may have the proper movement over the respective tables A and B. The work, or metal to be treated, is attached to or clamped on the table B by any suitable means, but in connection with the carriage or table A, I prefer to use a bed C, on which the model or pattern is secured. This bed C is connected centrally with the carriage A, and on the rear side of the bed are provided the bosses $c$, in which work the adjusting screws $c'$, the latter having engagement with the table A, for the purpose of adjusting the bed C in a way to bring the same into a perpendicular position, as will be readily understood by reference to Figs. 2 and 5.

The driving shaft D of the machine extends across one of the end frames 10, and is journaled in suitable bearings $d$, attached to said end frame. This shaft D may be driven by any suitable means, but as shown by Fig. 3, said shaft has a driving pulley $d'$, adapted to accommodate a suitable belt (not shown), whereby the power from an engine or a line shaft may be transmitted to the machine. At one end, this driving shaft D has a worm 25, which meshes with a worm gear 26, on a longitudinal shaft 27, the latter being journaled in appropriate bearings on the end frames 10, and said shaft 27 being on the rear side of the machine. This shaft is provided with a stepped or coned pulley 28, which operates to drive a belt 29, the latter extending to and around another cone pulley 30, on a shaft 31. These shafts 31, 32, are journaled in appropriate bearings on the end frames 10, and they lie one below the other on the front side of the machine, as shown by Figs. 1, 2 and 5. It will be understood that the motion of the shaft D is transmitted through the counter shaft 27, and the cone and belt gearing to the shaft 31, so as to drive the latter at the required speed, and this shaft 31 operates to drive the shaft 32 through a gear pinion 33, and a gear wheel 34, said gear pinion 33 being provided on one end of the shaft 31, and meshing with the gear 34, which is provided on the corresponding end of the shaft 32. With the driven gear 34 is associated a driving element 35, the latter being in the form of a cam, which is adapted to operate means for imparting motion to the feed shaft 21, and means for the proper operation of the carrying beam for the tracer and the cutter. This driving element 35 is shown as being made in one piece with, or attached rigidly to, the gear 34, for the purpose of making the element 35 rotate with said gear 34, and the shaft 32. The element 35 is provided with an irregular edge forming a peripheral cam 36, and it is, furthermore, provided with a radial slot 37, in which is secured a wrist or crank pin 38, the latter being adjustable to any desired position in the slot 37, so as to occupy different distances from the axis of rotation of the element 35. The crank pin 38 may be of any usual or preferred construction, and it is adapted to be fixed or held at any desired point in the slot 37 by any usual or preferred means, hence I do not consider it necessary to illustrate the crank pin in detail.

The beam which carries the tracer and the cutter is indicated at E, said beam extending horizontally along the front side of the machine and in front of the two carriages or tables A, B. This beam is mounted at one end by devices which insure movement of said beam in any and all directions, and these devices are adjustable so as to make the beam assume any desired position with relation to the model and work tables. As shown, the beam E is of circular cross-section and on it is mounted a slide 39, adapted to carry the tracer or pointer F, while a similar carriage 40 is fitted slidably on said beam for the purpose of supporting the rotating cutter G. The tracer and the cutter are of usual or preferred constructions, and normally said tracer and cutter occupy stationary positions on the beam. The cutter, of course, is adapted for rotation at the required speed, while the model and the work are carried by the tables across the path of the tracer and the cutter, both the tracer and the cutter being movable with the beam, so as to also traverse the model and the work on the respective carriages. The slide 40 for the cutter is provided with an arbor 41, adapted to carry a loose guide pulley 42. As shown, the slide 39 for the tracer supports an idle pulley 43, the latter being loosely mounted on the non-rotatable spindle of the tracer, and said pulley 43 being in line with the pulley 42. The rotary cutter is provided with a pulley 44, around which passes the endless driving belt 45, said belt also fitting around the idle pulleys 42, 43, and it is driven from one member 46 of a double pulley, the other member 47 of said double pulley being driven by a vertically ranging cross belt 49, which is driven from a pulley 50, at one end of the main shaft D. The double pulley 46—47 is mounted on one part of the universal joint for the carrying beam E, and the member 46 of said double pulley is in alinement with, or in the same plane longitudinally of the machine as, the cutter pulley 44, and idle pulleys 42, 43, as shown by Fig. 4. It will be noted that the driving belt 45 has a bight fitting snugly around the cutter driving pulley 44, and that said belt 45 thence extends to and around the idle pulley 42, thence to and around the pulley 43 of the tracer, and thence back to one member of the pulley 46. By reason of the described location of the idle pulleys 42, 43, the latter being on the tracer, the cutter may be adjusted relative to the tracer without slackening the belt 45. Furthermore, it will be observed that the driving belt 45 extends between and around the pulleys 43, 46, so as to always maintain the same operative length of the belt, the pulley 46 remaining in a predetermined relation which is concentric with the axis of movement of the carrying beam E under all adjustments of the latter, whereby the cutter G is adapted to be driven from the shaft D without any tendency of the belts 45, 49, becoming slack or loose, owing to the movement and adjustment of the carrying beam in the operation of the machine.

One member of the universal joint for the carrying beam is a boxing 51, which is fitted on, and secured in a suitable way, to the beam E. This boxing has a vertically disposed head 52, which fits between the lugs 53 of a slidable member 54, and the members 51, 54, are connected pivotally by the center screws $55^a$, which are placed vertically, as shown by Fig. 3, so as to furnish a vertical axis on which the member 51, and the beam E, are adapted to turn freely in a horizontal plane. The slidable member 54 of the universal joint is provided in its rear side with a dovetailed recess in which is fitted a slide rail 55, see Figs. 3 and 4. This slide rail is comparatively short and ranges horizontally and in the direction of the length of the machine, said slide rail affording means whereby the members 51, 54, of the universal joint may be adjusted in a rectilinear horizontal path parallel to the length of the slide rail 12, and the beam E. The short slide rail 55 is dovetailed in cross-section so as to fit snugly in the recess of the member 54, and normally this member is clamped on or fixed to the slide rail 55 by suitable means, such as the binding screw 56. The slide rail 55 is attached rigidly to one end portion of an arbor 57, the latter being arranged at right angles to the carrying beam E and the slide rail, so as to extend transversely across one end frame 10 of the machine. This arbor is adapted to rock or turn on its longitudinal axis, so as to afford a horizontal axis of movement for the carrying beam E. Said arbor 57 is mounted in the jaws of clamps or bearings 58, which are provided on an adjustable bed 59, the latter being fitted within or between the cheek piece 60 attached to the end frame 10. The bed plate 59 normally remains in a stationary position on the end frame, and it is provided at its rear end with an arm 61, in which is journaled an adjusting screw 62, the latter having engagement with the heel or rear end of the arbor 57, for the purpose of adjusting the latter endwise in its bearings 58, as will be understood by reference to Figs. 3 and 4.

It will be understood that the carrying beam E is adapted to move freely in horizontal and vertical planes, because the beam E may swing radially around the vertical axis afforded by the center screws 55ª, and said beam may swing freely in a vertical plane on the horizontal axis afforded by the arbor 57. At the same time the beam E and the devices thereon may be adjusted endwise in a horizontal plane by moving the member 54 of the universal joint in one direction or the other on the short slide rail 55, and furthermore, the entire universal joint may be adjusted, with the beam E, laterally or sidewise with respect to the tables by moving the arbor 57 endwise in its bearings 58, such adjustment being facilitated by the employment of the screw 62. It will be thus seen that the beam E is capable of all the movements required in the operation of the machine, and said beam may be adjusted as described, in order to give the cutter and the tracer the required position relative to the work and the model. The carrying beam E is supported at its end opposite to the universal joint by a pitman 63, the lower end of which is fitted on the adjustable crank pin 38 of the driving member 35, while the upper end of said pitman is attached to a stud 64 at the otherwise free end of the carrying beam E. This pitman 63 may be made in one single continuous piece, as represented by Fig. 1, but I prefer to make the pitman in two or more lengths, each provided with a slot 65, and disposed in overlapping order so as to be connected adjustably by binding screw 66, as shown by Fig. 2, whereby the pitman may be adjusted lengthwise between the wrist pin 38, and the stud 64, which connects said pitman with the carrying beam. It will be evident that the free end of the beam may be raised or lowered with respect to the axis of rotation of the driving element 35 and the shaft 32, whereby the tracer F is made to work across the upper part of the table A and its bed C, or it may be lowered to operate across the lower part of the table. The length of the stroke, or the travel of the tracer F and the tool G relative to the carriages A, B, is secured by adjusting the crank pin 38 in the radial slot 37 of the driving element 35, and when the crank pin is once adjusted, the link 63 has reciprocating motion given thereto within fixed limits by said crank pin 38, the travel of the tracer relative to the work being within well defined limits owing to the operation of the crank pin by the member 35.

The carrying beam E and the tools thereon are drawn normally toward the tables by any suitable form of retractor, so as to make the tracer follow accurately the lines of the model. As shown, I employ a drop weight 67, attached to a cable 68, and this cable runs over an idle pulley 69, journaled on the frame, said cable being fastened to the carrying beam E.

In Fig. 2 the drop weight and the cable are shown at one end of the machine, but it is evident that the cable may be fastened to the beam at any suitable point.

I will now proceed to describe the means for automatically driving the feed shaft 21 from the shaft 32. A driving lever 70 is fulcrumed on one of the end frames by a stud 71, as shown by Fig. 2. This lever is provided at one end with a short arm 72, which is equipped with a roller or shoe 73, adapted to ride upon the peripheral cam 36 of the driving member 35, whereby the cam is adapted to rock or vibrate the lever 70. A sleeve 74 is fitted on the long arm of the lever so as to be held in any desired position thereon by a binding screw 75, and to this sleeve are pivoted the lower ends of links 76, by a pin 77. These links 76 diverge upwardly and are connected pivotally to feed levers 78, the latter being hung loosely on an end of the shaft 21, so as to extend in opposite direction therefrom, as shown by Fig. 2. A ratchet wheel 79 is fixed on this shaft 21, between the two levers, and said levers are provided with pawls 80, 81, the same being arranged to engage with teeth on the respective sides of the ratchet wheel for the purpose of making the pawls operate alternately in rotating the ratchet wheel, whereby the feed shaft 21 is caused to rotate in one direction only.

By reference to Fig. 2 it will be noted that the pawl and ratchet feed mechanism acts intermittently to impart motion to the feed shaft 21 by which the carriages A, B are advanced with intervals of rest or dwell; and, furthermore, that said pawl and ratchet feed mechanism is double acting, that is to say, it acts on the feed shaft twice to one complete rotation of driving member 35. The peripheral cam 36 has high and low portions concentric with the axis of rotation of member 35 and shaft 32, and two eccentric portions connecting said concentric portions, so that lever 70 will not be operated when shoe 73 rides on either of said concentric portions of cam 36, thus permitting shaft 21 and carriages A, B to be at rest, whereas the engagement of shoe 73 with either of the eccentric portions of cam 36 causes lever 70 to be rocked so as to operate one or the other of the pawls 80 or 81 for turning the ratchet wheel 79 and shaft 21, thus moving tables A, B one step at a time. As the long arm of lever 70 is depressed by shoe 73 riding on one eccentric part of cam 36, the links 76 and levers 78 are drawn down, thereby causing pawl 81 to turn ratchet wheel 79 and shaft 21 a certain distance, pawl 80 slipping idly. Shoe 73 now rides on the high concentric part of cam 36 and lever 70, links 76, levers 78, pawls 80, 81, and shaft 21 remain at rest. Now when the next eccentric part of cam 36, during the next half rotation of member 35, engages shoe 73, lever 70 is operated so as to raise the long arm thereof, and correspondingly lift links 76, and levers 78, whereby pawl 81 slips idly and pawl 80 rotates the ratchet wheel 79 and shaft 21 so as to impart another step to the tables A, B.

The effective parts of cam 36 are so located that the pawls 80, 81, will turn the ratchet wheel as the tool beam E reaches the upper and lower limits of its movement, and this serves to advance the pattern and work carriages in the intervals between the work strokes of the tracer and the tool in both directions.

I will now proceed to describe the connections between the positively operated model table and the work table, for the purpose of moving the last mentioned table from said model table, reference being had to Figs. 1, 4 and 5.

Depending from the model table A is a rigid arm 82, the same being provided with a longitudinal slot 83. A slide 84 is fitted against this arm 82 and held in place by a bolt 85, which passes through the slot, and is adapted to hold said slide at any desired adjustment on the arm 82. A horizontal rod 86 passes through and is held in the slide 84, and this rod extends through clip 87 in which the rod is adjustable endwise, said rod being normally fixed to the clip by a binding screw 88. The clip is pivoted by a pin 89 to a sleeve 90, said sleeve being adjustable lengthwise of a vertical lever 91. The sleeve 90 is held at any desired point on the lever 91 by a binding screw 92. A vertical supporting bar 93 is fastened rigidly in a suitable way on the slide rail 12, said bar 93 lying between the carriages A, B. As shown by Fig. 1, the lever 91 is pivoted at its upper end to the supporting bar 93 by a stud or bolt 94. On the lever 91 is fitted an adjustable sleeve 95 adapted to be held in a fixed position thereon by a clamping screw 96, and this sleeve of the lever is connected with the work table by a link or pitman 97. Said pitman is pivoted directly to the sleeve 95, and it has a pivotal and adjustable connection with a slotted portion 98 of the work table B.

It will be understood that the model table and its arm 82 impart movement to the lever 91 through the slide 84, the rod 86, the clip 87, and the sleeve 90, whereby the lever 91 is operated from the model table. This lever gives movement to the work table proportionately to the travel of the model table through the sleeve 95 and the link 97, whereby the work table is operated automatically from the positively driven model table, and the movement of the work table is proportionate to that of the model table. The proportional travel of the work table relative to the model table may be varied by adjusting the several connections between the two tables, as for example, by raising the slide 84 on the arm 82, by adjusting the rod 86 in the sleeve 87, so as to bring the lower end of the lever 91 toward or from the arm 82 and thereby increase or decrease the arc of movement of said lever 91, by raising or lowering the sleeve 90 on the lever 91, and by raising or lowering the sleeve 95 with the link 97 relative to the lever and the work table.

In Figs. 1, 2 and 4 of the drawings, I have shown the pitman 63 connected directly to the unsupported end of the carrying beam by a stud 64; but in Figs. 8 and 9, I have represented a construction by which an adjustable connection is secured between the beam E and the pitman 63, for the purpose of making the tracer F follow the lines of the pattern with ease and freedom. As shown, the stud 64$^a$ occupies a socket in the end of the beam E, and is held in place by a suitable fastener or pin 99. This stud 64$^a$ is exposed outside of the end of the beam and is provided with a dovetailed head 100. Said head fits in a dovetailed recess of a horizontal arm 101, which lies at right angles to the carrying beam E, and which is adjustable lengthwise relative to said beam on the head of the stud. This horizontal arm is provided at one end with a stud bolt 102, which passes loosely through an opening in the upper end of the pitman 63, and on this stud bolt is screwed a nut 103, for the purpose of holding the parts in their proper relation. It will be seen that the arm 101 may be adjusted on the dovetailed head 100, across the end of the beam E, for the purpose of moving the pivotal connection 102 of the pitman 63 toward or from the beam E, whereby the angle of inclination of the pitman 63 between the crank pin 38, and stud 64$^a$ may be varied so as to secure the object desired. The bar 101 is held in its adjusted position by binding screw 104, which is mounted in the arm and is adapted for engagement with the head 100, see Fig. 9.

In Fig. 7 of the drawings I have shown a construction of the pitman 63, by which the end of the beam E may be easily dismounted. The upper end of this pitman has a slot 105, with an off-set 106, which opens through one edge of the link. The end of the beam E is adapted to fit in the curved upper end 107 in the slot 105, and against the pitman 63 is fitted a plate 108, which is clamped in position by a screw 109 adapted to pass through the lower part of the slot 105, said screw 109 being engaged by a nut (not shown) whereby the screw is adapted to clamp the plate on said pitman 63. The plate 108 has a curved recess 110 to engage the under side of the stud 64 on the beam E of Fig. 1, and when it is desired to dismount the beam it is only necessary to release the screw 109, and drop the plate 108 below the off-set 106 of the slot 105, whereby the stud 64 may be dropped down in the slot 105, and moved laterally through the off-set 106 to disconnect the beam and the pitman 63.

As is usual in machines of this class, oil is supplied to the work table and the cutter G. The oil dripping from the work table falls into a collecting trough 111, which is shown as being supported on one of the tie rods 11 of the machine frame.

Having thus described my invention, what I claim as new and desire to secure by Letters Patent is:—

1. In an automatic engraving machine, non-revoluble model and work carriages, means for moving said carriages in a rectilinear path, a carrying member mounted for movement relative to both carriages, a tool and a tracer on said member, and automatic means for imparting to said carrying member a reciprocating travel relative to both carriages, said movement of the carrying member being effected in the intervals between the movements of said carriages.

2. In an automatic engraving machine, non-revoluble model and work carriages, means for moving said carriages at a required speed, a carrying member mounted for movement in a path substantially at right angles to that of said carriages, a tracer and a tool carried by said member and adapted to coöperate with the model and work carriages, respectively, and automatic driving mechanism operatively connected to said carrying member for reciprocating said member across the path of said carriages, said reciprocating movement of the carrying member taking place in the intervals between the movements of said carriages.

3. In an automatic engraving machine, a guide-way, a non-revoluble model carriage movable in a rectilinear path on said guideway, a non-revoluble work carriage also movable in a rectilinear path on the guideway, means for positively moving one of said carriages, operative connections between the two carriages for moving one carriage simultaneously with and in the same direction as the other carriage, a carrying beam mounted for movement across the path of both carriages, and automatic mechanism coöperating with said beam for reciprocating the latter across the path of said carriages, and in the intervals between the movement thereof.

4. In an automatic engraving machine, a non-revoluble model carriage, a non-revoluble work carriage, means for positively moving one of said carriages in a rectilinear path, adjustable means connecting one carriage with the other carriage for positively operating one of them from the other and for varying the travel of one carriage proportionately to the travel of the other carriage, a carrying beam mounted at one end for adjustment relative to the path of both carriages, and automatic driving mechanism coöperating with said beam for reciprocating the latter across said carriages and in the intervals between the travel thereof.

5. In a machine of the class described, non-revoluble model and work carriages, means for moving said carriages in a rectilinear path, a carrying member mounted at one end for adjustment to different positions relative to said carriages, a tracer and a cutter on said member, and automatic mechanism connected with the other end of said member for imparting reciprocating movement to said member and to the devices carried thereby, so as to give reciprocating movement to both the tracer and the cutter relative to the respective carriages, said reciprocating movement of the tracer and the tool taking place in the intervals between the travel of said carriage.

6. In a machine of the class described, non-revoluble model and work carriages, means for moving said carriages in a rectilinear path, a carrying member mounted for adjustment in horizontal and vertical planes, said member being adjustable also across the carriages, lengthwise thereof, and toward or from the said carriages, a tracer and a cutter on said member, and means for automatically imparting reciprocating motion to said member in a path across the line of travel of the carriages and in the intervals between the movements thereof, whereby a reciprocating movement is given to both the tracer and the cutter relative to the respective carriages.

7. In a machine of the class described, non-revoluble model and work carriages limited to movement in a predetermined rectilinear path, means for automatically moving said carriages, a carrying member adapted for reciprocating movement across said carriages, a universal joint supporting said member at or near one end thereof, a tracer and a cutter carried by said member, and automatic mechanism for reciprocating said carrying member in the intervals between the movements of said carriages.

8. In an automatic engraving machine, model and work carriages, means for intermittently imparting to said carriages movement in a predetermined path, a tracer and a tool in coöperative relation to the respective carriages, and means for moving said tracer and tool relative to the respective carriages in the intervals between the movement thereof.

9. In an automatic engraving machine, model and work carriages, automatic feed mechanism for moving said carriages in a predetermined path and with periods of rest or dwell, a carrying member provided with a tracer and a tool which are disposed in coöperative relation to the respective carriages, and automatic driving devices associated with said carrying member for moving it during the periods of rest or dwell of said carriages.

10. In an automatic engraving machine, model and work carriages, means for intermittently moving said carriages in a rectilinear path, a carrying member, a tracer and a tool supported by said member in coöperative relation to the respective carriages, and automatic driving devices for moving the carrying member during the intervals of rest or dwell of the carriages, said driving devices including adjustable means for varying the extent of movement imparted to the carrying member by said devices.

11. In an automatic engraving machine, a carrying member, an arbor supported in bearings in a position substantially at right angles to said carrying member, said arbor being free to turn and to slide in said bearings, a screw adapted for operation to adjust said arbor endwise, coöperating joint-members pivoted together for movement on a vertical axis, one of said joint-members being attached to the carrying member, and a slide rail fixed to the arbor, the other joint-member being connected to said rail for slidable adjustment lengthwise thereof.

12. In an automatic engraving machine, an arbor supported for endwise and axial movement, a slide rail fixed to said arbor, an adjusting screw coöperating with the arbor for imparting endwise adjustment thereto, pivoted joint-members, one of said members being fitted to the slide rail for adjustment lengthwise thereof, means for holding said joint-member in fixed position on the slide rail, the other joint-member being free to turn on its pivotal connection with said relatively fixed member, and a tool carrying member secured to the freely-turning joint-member.

13. In a machine of the class described, suitable carriages, means for moving the carriages in a rectilinear path, a tool carrying beam pivotally supported at or near one end, and automatic means coöperating with said beam for imparting thereto a progressive movement relative to, and across the path of feed of, said carriages.

14. In a machine of the class described, suitable carriages, means for moving said carriages in a rectilinear path, a tool carrying beam pivotally supported at or near one end, and a cam operating to impart to the tool-carrying beam a movement across the carriages; the direction of such automatic movement of the beam being at an angle to the path of automatic movement of the carriages.

15. In a machine of the class described, suitable non-revoluble carriages, automatic means for moving the same in a rectilinear path, a carrying beam pivotally supported at or near one end, a driving member, and means operated by said driving member for automatically imparting to said beam a reciprocating movement across said carriages, said operating means being adjustable to vary the extent of such automatic reciprocation of the beam relative to the carriages.

16. In a machine of the class described, suitable carriages, automatic means for moving the carriages in a predetermined path, a tool-carrying member, a driving member, and a pitman having an adjustable connection with the driving member for automatically moving the tool carrying member relative to, and across the path of, said carriages.

17. In a machine of the class described, suitable carriages, automatic means for moving said carriages in a predetermined path, a tool-carrying member, a driving member, and an extensible pitman connecting the tool carrying member and the driving member and operating to impart movement automatically to the tool-carrying member relative to, and across the path of, said carriages.

18. In a machine of the class described, suitable carriages, means for moving said carriages in a predetermined path, a carrying member, automatic means for imparting to said carrying member a reciprocating movement relative to said carriages and in the intervals between the travel thereof, and adjusting means independent of the automatic member-operating-means whereby said carrying member may be adjusted toward or from the carriages.

19. In a machine of the class described, suitable carriages, automatic means for moving said carriages in a predetermined path, a tool carrying beam, a driving pitman pivoted to said beam, means for adjusting the pivotal connection of the driving pitman relative to the beam, and automatic means for operating said pitman to give to the beam a movement across the path of said carriages.

20. In a machine of the class described, model and work carriages, a feed shaft, means operated by the feed shaft for moving said model carriage, a driving cam, a lever operated by said driving cam, pawl and ratchet feed mechanism actuated by said driving lever and coöperating with said feed shaft, a tool-carrying beam, and means operated by said driving cam for automatically moving said beam relative to, and across the path of, said model and work carriages.

21. In a machine of the class described, non-revoluble work and model carriages, a carrying member mounted for reciprocating movement relative to said carriages, a tracer and a cutter carried by said member, means for moving both of said carriages in a rectilinear path, means for normally impelling said carrying member toward said carriages, and automatic means for reciprocating said carrying member in a path across, and in the intervals between the travel of, said carriages.

22. In a machine of the class described, a tool carrying beam, a universal joint for supporting said beam, a tracer and a cutter supported by the beam, a driving pulley concentric with the axis of the universal joint, a pulley on the cutter, idler pulleys carried by the beam and the tracer, and an endless driving belt fitted to said driving and idler pulleys and adapted for the operation of the cutter.

23. In a machine of the class described, a non-revoluble model carriage, a bed supported by said carriage, means for adjusting said bed on the said model carriage, a non-revoluble work carriage, connections between the model and work carriages, said connections being adjustable at will for varying the movement of one carriage relative to the movement of the other carriage, and means for presenting a tracer and a tool to the respective carriages.

24. In a machine of the class described, a model carriage, a work carriage, means for positively actuating the model carriage, a horizontal rod connected adjustably with the model carriage, a lever, an adjustable connection between said rod and the lever, and an adjustable connection between said lever and the work carriage, whereby the proportional movement of the work carriage to the model carriage may be varied.

25. In a machine of the class described, a model carriage, a work carriage, a lever supported independently of both carriages, adjustable connections between said lever and the model carriage, and another adjustable connection between said lever and the work carriage.

26. In a machine of the class described, a model carriage provided with a depending arm, a work carriage, a lever supported independently of both carriages, a rod, devices for connecting said rod adjustably with the arm of the model carriage and with the lever, and other devices for adjustably connecting said lever with the work carriage.

27. In a machine of the class described, a tool-carrying beam, a universal joint for supporting the beam at or near one end thereof, a driving pitman therefor, and detachable connections between said beam and said pitman whereby the beam may be dismounted at will from the pitman.

28. In an engraving machine, a tool-carrying beam provided with a dovetail, an arm fitted to said dovetail and adjustable across said beam, a driving pitman connected with the arm and adjustable therewith relative to the beam, and means for operating said pitman automatically.

29. In a machine of the class described, non-revoluble work and model carriages, automatic means for moving one of said carriages, a plurality of adjustable connections between said carriages whereby one carriage is moved by the travel of the automatically driven carriage, said adjustable connections being independent of the aforesaid automatic means and, further, said connections being adapted to vary the movement of the second carriage relative to the travel of the automatically driven carriage, a tracer and a tool, and means for presenting the same to the respective carriages.

30. In a machine of the class described, non-revoluble work and model carriages, automatic means for moving one of said carriages, a lever mounted independently of said carriages and the aforesaid automatic means, means connecting said lever with the automatically driven carriage, whereby the lever is operated by the movement of the carriage, other means connecting said lever with the other carriage, whereby the motion of the automatically driven carriage is transmitted through said lever to the second carriage, and a tool and a tracer coöperating with the respective carriages.

31. In a machine of the class described, model and work carriages movable in rectilinear paths, means for intermittently imparting feed motion to one of said carriages, means for operating the other carriage by the movement of said driven carriage, said means operatively connecting said carriages, a tracer and a tool in coöperative relation to the model and work carriages, respectively, an automatic driving means for shifting the tracer and tool in the intervals between the feed movements of said carriages.

32. In a machine of the class described, model and work carriages, automatic mechanism for imparting intermittent feed movement to one of said carriages, adjustable connecting means intermediate said carriages whereby one carriage is operated by the motion given to the other by said automatic mechanism, a tracer and a tool in coöperative relation to the model and work carriages, respectively, and automatic driving means coöperating with said tracer and tool for shifting the latter in the intervals between the feed motions of said carriages.

In testimony whereof I have signed my name to this specification in the presence of two subscribing witnesses.

VALDEMAR J. HANSEN.

Witnesses:
H. F. BERNHARD,
JAS. H. GRIFFIN.